United States Patent
Kim et al.

(10) Patent No.: US 10,661,671 B2
(45) Date of Patent: May 26, 2020

(54) CHARGING APPARATUS FOR ELECTRIC VEHICLE

(71) Applicants: Hyundai Motor Company, Seoul (KR); Kia Motors Corporation, Seoul (KR)

(72) Inventors: Jongpil Kim, Gyeonggi-do (KR); Sihun Yang, Gyeonggi-do (KR); Woo Young Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 4 days.

(21) Appl. No.: 16/168,492

(22) Filed: Oct. 23, 2018

(65) Prior Publication Data

US 2019/0299792 A1    Oct. 3, 2019

(30) Foreign Application Priority Data

Apr. 3, 2018  (KR) .................. 10-2018-0038486

(51) Int. Cl.
| | |
|---|---|
| *H02J 7/02* | (2016.01) |
| *H02M 1/42* | (2007.01) |
| *H02M 7/5387* | (2007.01) |
| *H02M 1/44* | (2007.01) |
| *B60L 53/22* | (2019.01) |

(52) U.S. Cl.
CPC .............. *B60L 53/22* (2019.02); *H02J 7/022* (2013.01); *H02M 1/4233* (2013.01); *H02M 1/44* (2013.01); *H02M 7/53871* (2013.01); *B60L 2210/12* (2013.01); *B60L 2210/42* (2013.01)

(58) Field of Classification Search
CPC .............. B60L 11/1812; B60L 2210/42; B60L 2210/12; H02J 7/022; H02M 1/4233; H02M 1/44; H02M 7/53871
USPC ......................................................... 320/109
See application file for complete search history.

(56) References Cited

U.S. PATENT DOCUMENTS

| | | | |
|---|---|---|---|
| 9,493,080 B2 | 11/2016 | Kvieska et al. | |
| 2010/0006356 A1* | 1/2010 | Curry et al. | ............... B60L 8/00 180/65.8 |
| 2010/0080022 A1 | 4/2010 | Schmidt | |
| 2012/0300515 A1* | 11/2012 | Carletti et al. | ...... H02M 1/4225 363/74 |

(Continued)

*Primary Examiner* — Sun J Lin
(74) *Attorney, Agent, or Firm* — Mintz Levin Cohn Ferris Glovsky and Popeo, P.C.; Peter F. Corless

(57) ABSTRACT

Disclosed herein is a charging apparatus for an electric vehicle. The charging apparatus includes a motor generating a power for vehicle driving. An inverter supplies a power to the motor. An alternating current (AC) power input stage receives an AC input power from among a single-phase AC power and a multi-phase AC power. A power factor corrector includes full bridge circuits receiving the AC input power through the AC power input stage. A link capacitor is charged through a combination of the power factor corrector, the motor, and the inverter. A switch network has a first switch connecting one of an AC power input line and a neutral line of the AC power input stage to the power factor corrector and a second switch selectively connecting the AC power input stage to the power factor corrector or the link capacitor. A controller operates the power factor corrector and the switch network based on a received AC input power condition.

18 Claims, 15 Drawing Sheets

(56) References Cited

U.S. PATENT DOCUMENTS

| | | | | |
|---|---|---|---|---|
| 2019/0291585 A1* | 9/2019 | Yang et al. | ............. | H02P 27/06 |
| 2019/0291586 A1* | 9/2019 | Kim et al. | ............. | H02M 1/44 |
| 2019/0299792 A1* | 10/2019 | Kim et al. | ............. | H02M 1/36 |
| 2019/0299793 A1* | 10/2019 | Kim et al. | ............. | H02J 7/022 |

* cited by examiner

BI-PHASE
SYMMETRIC POWER SOURCE

SINGLE-PHASE
ASYMMETRIC POWER SOURCE

THREE-PHASE
SYMMETRIC POWER SOURCE

CHARGING APPARATUS FOR ELECTRIC VEHICLE

CROSS-REFERENCE TO RELATED APPLICATION

This application is based on and claims priority under 35 U.S.C. § 119 to Korean Patent Application No. 10-2018-0038486, filed on Apr. 3, 2018, the disclosure of which is incorporated by reference in its entirety.

BACKGROUND

1. Field of the Disclosure

The present disclosure relates to a vehicle, and more particularly to a charging apparatus for an electric vehicle configured to travel only using the power of a motor.

2. Description of the Related Art

Unlike an internal combustion vehicle designed to acquire primary energy by burning fossil fuels, an electric vehicle is designed to use electric energy as a primary energy source. Therefore, it is necessary for the electric vehicle to include a high-voltage battery to store electric energy therein, a motor used as a power source, and an inverter to drive the motor.

A charger for charging the battery of the electric vehicle may be classified into a slow-speed charger and a high-speed charger. The slow-speed charger may transmit commercial alternating current (AC) power to a vehicle without being converted. The high-speed charger may convert commercial AC power into direct current (DC) power, and transmit the DC power to the vehicle. The slow-speed charger has a simplified structure and a low price, such that the slow-speed charger may be developed more easily. However, to use the slow-speed charger, an on board charger (OBC) is required to be mounted within the electric vehicle.

The type of AC power provided through the slow-speed charger varies according to country where the slow-speed chargers are installed. To charge a battery of the electric vehicle using various types of AC power, it is necessary for the on board charger (OBC) to be responsive to various types of AC power.

SUMMARY

Therefore, it is an aspect of the present disclosure to provide a charging apparatus for an electric vehicle, which has a reduced-sized and simplified structure, and charges a battery of the electric vehicle upon receiving power from various types of power sources. Additional aspects of the present disclosure will be set forth in part in the description which follows and, in part, will be obvious from the description, or may be learned by practice of the present disclosure.

In accordance with an aspect of the present disclosure, a charging apparatus for an electric vehicle may include: a motor configured to generate power required to drive the electric vehicle; an inverter configured to supply power to the motor; an alternating current (AC) power input stage configured to receive at least one AC input power from among single-phase AC power and multi-phase AC power; a power factor corrector having a plurality of full bridge circuits configured to receive the AC input power through the AC power input stage; a link capacitor to be charged through at least one combination of the power factor corrector, the motor, and the inverter; a switch network having a first switch S1 for connecting any one of an AC power input line and a neutral line of the AC power input stage to the power factor corrector, and at least one second switch for selectively connecting the AC power input stage to the power factor corrector, or the link capacitor; and a controller configured to operate the power factor corrector and the switch network based on the condition of the AC input power received through the AC power input stage.

The plurality of full bridge circuits may further include a first full bridge circuit and a second full bridge circuit. A first leg of the first full bridge circuit may be connected to a first AC power input line of the AC power input stage; and a second leg of the first full bridge circuit may be selectively connected to any one of a second AC power input line and a neutral line of the AC power input stage via the first switch S1. A first leg of the second full bridge circuit may be connected to any one of three legs of the inverter via a third switch S5; and a second leg of the second full bridge circuit may be connected to a third AC power input line of the AC power input stage via a fourth switch S2.

The switch network may further include a fifth switch S3 disposed to connect the first leg of the first full bridge circuit and the first leg of the second full bridge circuit; and a sixth switch S4 disposed to connect the second leg of the first full bridge circuit and the second leg of the second full bridge circuit. The switch network may further include a seventh switch S7 disposed to connect one end of the link capacitor to a positive (+) electrode of the battery. The switch network may further include an eighth switch S6 disposed to connect an upper end of the first full bridge circuit and the end of the link capacitor. The condition of the AC input power may include a multi-phase condition and a single-phase condition of the AC input power. The condition of the AC input power may include a symmetric power condition and an asymmetric power condition of the AC input power.

In accordance with another aspect of the present disclosure, a charging apparatus for an electric vehicle may include: a motor configured to generate power required to drive the electric vehicle; an inverter configured to supply power to the motor; an alternating current (AC) power input stage configured to receive at least one AC input power from among single-phase AC power and multi-phase AC power; a power factor corrector having a first full bridge circuit and a second full bridge circuit configured to receive the AC input power through the AC power input stage; a link capacitor to be charged through at least one combination of the power factor corrector, the motor, and the inverter; a switch network having a first switch S1 for connecting any one of an AC power input line and a neutral line of the AC power input stage to the power factor corrector, and at least one second switch for selectively connecting the AC power input stage to the power factor corrector, or the link capacitor.

Additionally, the charging apparatus may include a controller configured to operate the power factor corrector and the switch network based on the condition of the AC input power received through the AC power input stage. A first leg of the first full bridge circuit may be connected to a first AC power input line of the AC power input stage; a second leg of the first full bridge circuit may be selectively connected to any one of a second AC power input line and a neutral line of the AC power input stage via the first switch S1; a first leg of the second full bridge circuit may be connected to any one of the three legs of the inverter via a third switch S5; and a second leg of the second full bridge circuit may be connected to a third AC power input line of the AC power input stage through a fourth switch S2.

The switch network may further include a fifth switch S3 disposed to connect the first leg of the first full bridge circuit and the first leg of the second full bridge circuit; and a sixth switch S4 disposed to connect the second leg of the first full bridge circuit and the second leg of the second full bridge circuit. The switch network may further include a seventh switch S7 disposed to connect one end of the link capacitor to a positive (+) electrode of the battery.

The switch network may further include an eighth switch S6 disposed to connect an upper end of the first full bridge circuit and the end of the link capacitor. The condition of the AC input power may include a multi-phase condition and a single-phase condition of the AC input power. The condition of the AC input power may include a symmetric power condition and an asymmetric power condition of the AC input power.

In accordance with another aspect of the present disclosure, a charging apparatus for an electric vehicle may include: a motor configured to generate power required to drive the electric vehicle; an inverter configured to supply power to the motor; an alternating current (AC) power input stage configured to receive at least one AC input power from among single-phase AC power and multi-phase AC power; a power factor corrector having a first full bridge circuit and a second full bridge circuit configured to receive the AC input power through the AC power input stage; a link capacitor to be charged through at least one combination of the power factor corrector, the motor, and the inverter; a switch network having a first switch S1 for connecting any one of an AC power input line and a neutral line of the AC power input stage to the power factor corrector, and at least one second switch for selectively connecting the AC power input stage to the power factor corrector, or the link capacitor; and a controller configured to operate the power factor corrector and the switch network based on the condition of the AC input power received through the AC power input stage.

A first leg of the first full bridge circuit may be connected to a first AC power input line of the AC power input stage; a second leg of the first full bridge circuit may be selectively connected to any one of a second AC power input line and a neutral line of the AC power input stage via the first switch S1; a first leg of the second full bridge circuit may be connected to any one of the three legs of the inverter via a third switch S5; and a second leg of the second full bridge circuit may be connected to a third AC power input line of the AC power input stage via a fourth switch S2. The switch network may further include a fifth switch S3 disposed to connect the first leg of the first full bridge circuit and the first leg of the second full bridge circuit; a sixth switch S4 disposed to connect the second leg of the first full bridge circuit and the second leg of the second full bridge circuit; a seventh switch S7 disposed to connect one end of the link capacitor to a positive (+) electrode of the battery; and an eighth switch S6 disposed to connect an upper end of the first full bridge circuit and the end of the link capacitor. The condition of the AC input power may include a multi-phase condition and a single-phase condition of the AC input power. The condition of the AC input power may include a symmetric power condition and an asymmetric power condition of the AC input power.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
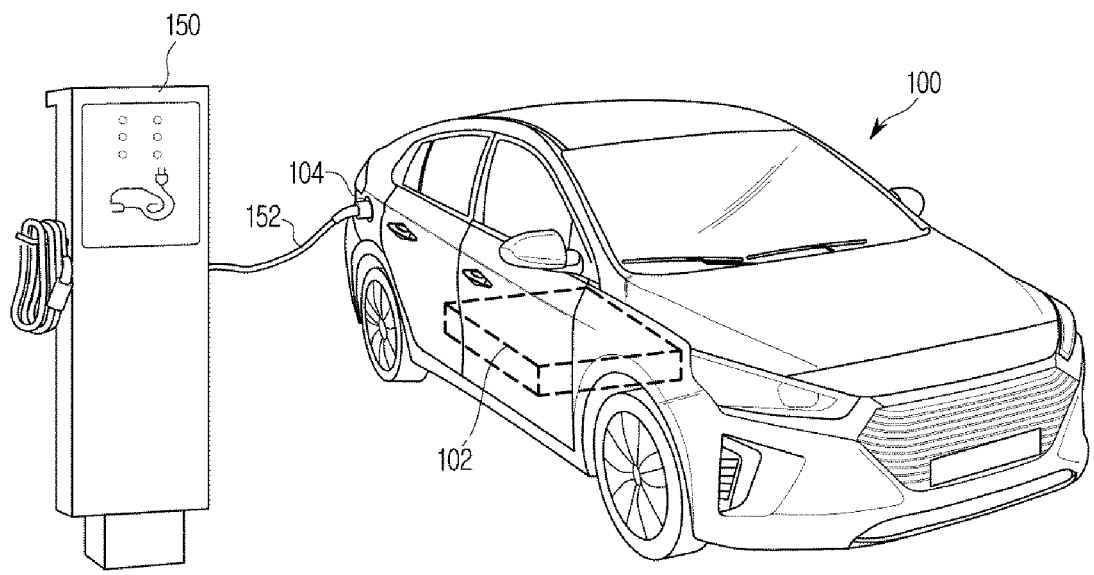
FIG. 1 is a view illustrating the appearance of an electric vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present disclosure, examples of which are illustrated in the accompanying drawings, wherein like reference numerals refer to like elements throughout.

FIG. 1 is a view illustrating the appearance of an electric vehicle according to an exemplary embodiment of the present disclosure. Referring to FIG. 1, an electric vehicle 100 may include a motor 212 (in FIG. 2). Therefore, the electric vehicle 100 may further include a high-voltage battery 102 configured to store power to be used for driving the motor 212. An auxiliary battery 208 (in FIG. 2) may also be mounted on one side of an engine room in a general internal combustion vehicle. However, a large high-capacity high-voltage battery 102 is required for the electric vehicle 100 whereas the auxiliary battery 208 (in FIG. 2) may be disposed at one side of an engine compartment of the general internal combustion vehicle. In the electric vehicle 100 according to the exemplary embodiment, the high-voltage battery 102 may be installed at a lower space of a rear passenger seat. Power stored in the high-voltage battery 102 may be used to generate power by driving the motor 212 (in FIG. 2). The high-voltage battery 102 according to the exemplary embodiment may be a lithium battery.

The electric vehicle 100 may include a charging socket 104. In particular, a charging connector 152 of an external slow-speed charger 150 may be connected to the charging socket 104 and thus, the high-voltage battery 102 may be charged with electricity or power. In other words, when the charging connector 152 of the slow-speed charger 150 is connected to the charging socket 104 of the electric vehicle 100, the high-voltage battery 102 of the electric vehicle 100 may be charged with electricity or power.

Figure 2:
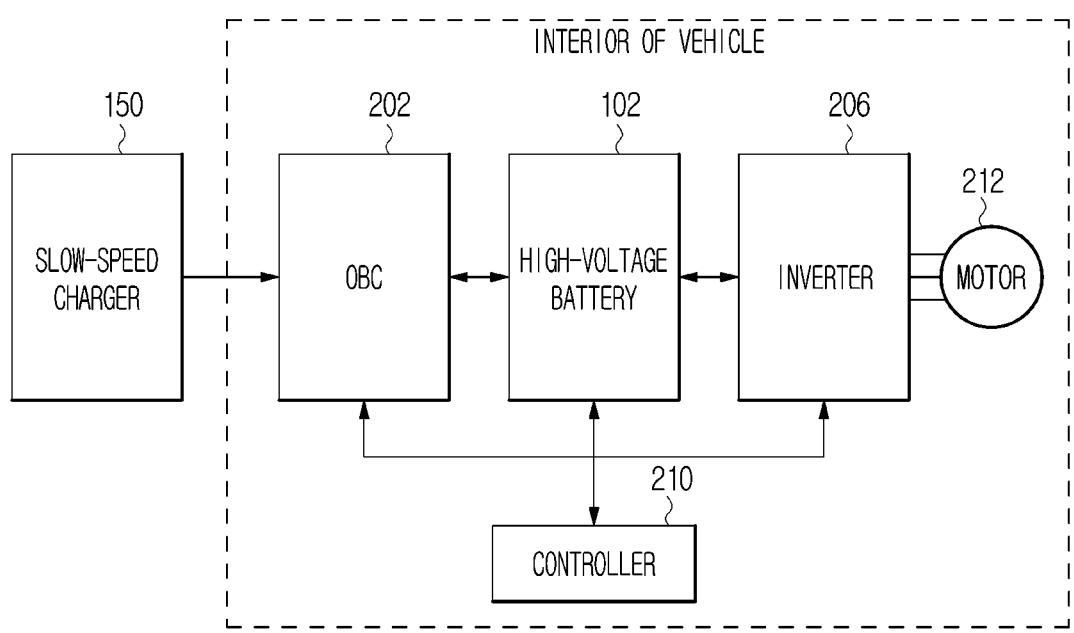
FIG. 2 is a block diagram illustrating a charging apparatus for an electric vehicle according to an exemplary embodiment of the present disclosure.

FIG. 2 is a block diagram illustrating a charging apparatus for the electric vehicle according to an exemplary embodiment of the present disclosure. Referring to FIG. 2, the slow-speed charger 150 may be used to charge the high-voltage battery 102. The high-voltage battery 102 may have a charging voltage of about 400V-800V. The slow-speed charger 150 may be configured to supply AC power to the electric vehicle 100 without being converted. The AC power supplied through the slow-speed charger 150 may be converted into a predetermined DC voltage by the electric vehicle 100.

An on board charger (OBC) 202 embedded in the electric vehicle 100 may be used to charge the high-voltage battery 102. The OBC 202 may be configured to convert AC power supplied from the slow-speed charger 150 into a DC voltage of about 800V, and may be configured to charge the high-voltage battery 102 with the DC voltage of 800V. The slow-speed charger 150 may be configured to supply AC power to the electric vehicle 100 without being converted. The AC voltage supplied through the slow-speed charger 150 may be converted into a DC voltage by the OBC 202, and may be used to charge the high-voltage battery 102.

Referring again to FIG. 2, an inverter 206 may be configured to convert the power of the high-voltage battery 102 to have the electrical characteristics required by the motor 212, and transfer the power to the motor 212. The motor 212 may be configured to generate power by rotating using the power transmitted through the inverter 206. In the charging apparatus shown in FIG. 2, the motor 212 and the inverter 206 may be used for charging the high-voltage battery 102 together with the OBC 202 as needed.

Figure 3:
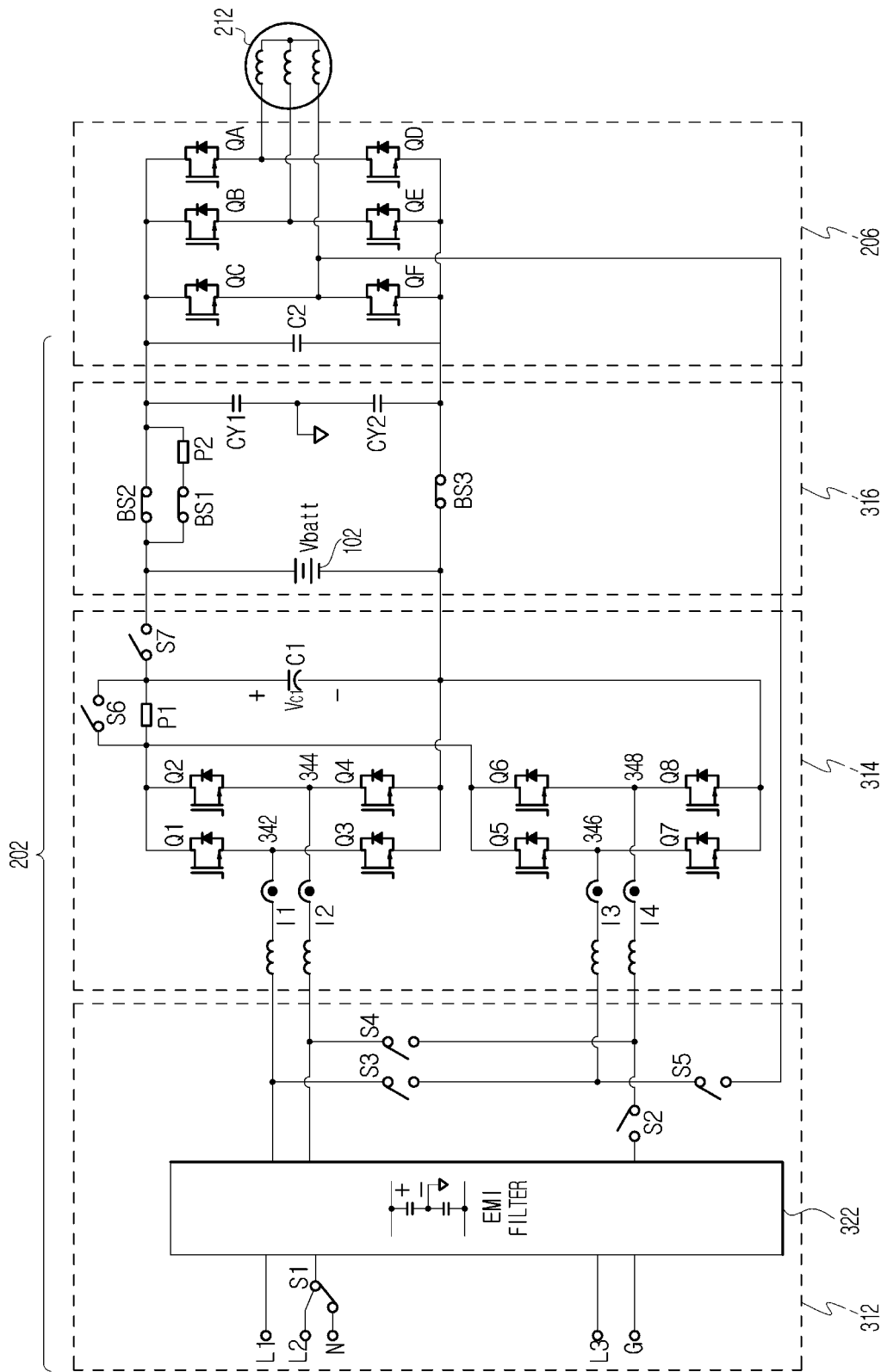
FIG. 3 is a view illustrating a configuration of an on board charger (OBC) according to an exemplary embodiment of the present disclosure.

FIG. 3 is a circuit diagram illustrating an on board charger (OBC) according to an exemplary embodiment of the present disclosure. FIG. 3 illustrates how the OBC 202 is connected to the high-voltage battery 102, the inverter 206, and the motor 212. Referring to FIG. 3, the OBC 202 may include an inputter 312, a boost power factor corrector 314, and a power relay assembly 316. The inputter 312 may be configured to receive AC power from an external AC power source. The inputter 312 may include 5 input lines L1, L2, L3, N, and G, an EMI (Electro Magnetic Interference) filter 322, and a switch S1.

In particular, the EMI filter 322 may be configured to remove noise included in the received AC power. The EMI filter 322 may be connected to the five input lines L1, L2, L3, N, and G. Additionally, AC power may be input from an external AC power source to the EMI filter 322 through the input lines L1, L2, L3, N, and G. The input lines L1, L2, and L3 may be AC power input lines, N is a neutral line, and G is a ground line. Up to three-phase AC power may be input to the EMI filter 322 through the AC power input lines L1, L2 and L3 from among the five input lines L1, L2, L3, N, and G. In other words, the three-phase AC power may be input to the EMI filter 322 through all the AC power input lines L1, L2, and L3. Alternatively, bi-phase AC power may be input to the EMI filter 322 only through the AC power input lines L1 and L2, or single-phase AC power may be input to the EMI filter 322 only through the AC power input line L1 and the neutral line N.

Further, the switch S1 of the inputter 312 may connect any one of the AC power input line L2 and the neutral line N to the EMI filter 322. If the input AC power is three-phase AC power or bi-phase AC power, the switch S1 may be operated to have the AC power input line L2 connected to the EMI filter 322. If the input AC power is single-phase AC power, the switch S1 may be operated to have the neutral line N connected to the EMI filter 322. The boost power factor corrector 314 may include a first full bridge circuit including switching elements Q1, Q2, Q3, and Q4, and a second full bridge circuit including switching elements Q5, Q6, Q7, and Q8. A first leg 342 disposed between the switching elements Q1 and Q3, a second leg 344 disposed between the switching elements Q2 and Q4, a third leg 346 disposed between the switching elements Q5 and Q7, and a fourth leg 348 disposed between the switching elements Q6 and Q8 may be connected to the EMI filter 322.

The first leg 342 may be configured to detect a phase current I1 transmitted from the EMI filter 322 to the full bridge circuit of the boost power factor corrector 314. The second leg 344 may be configured to detect a phase current I2 transmitted from the EMI filter 322 to the full bridge circuit of the boost power factor corrector 314. The third leg 346 may be configured to detect a phase current I3 transmitted from the EMI filter 322 to the full bridge circuit of the boost power factor corrector 314. The fourth leg 348 may be configured to detect a phase current I4 transmitted from the EMI filter 322 to the full bridge circuit of the boost power factor corrector 314. Each of the first to fourth legs 342, 344, 346, and 348 may include an inductor component.

In the charging apparatus according to the exemplary embodiment of the present disclosure shown in FIG. 3, the full bridge circuit constituting the boost power factor corrector 314 may include the four switching elements Q1, Q2, Q3, and Q4, and the two legs 342 and 344 in one group (the first full bridge circuit), and the other four switching elements Q5, Q6, Q7, and Q8 and the two legs 346 and 348 in another group (the second full bridge circuit). The first full bridge circuit and the second full bridge circuit may be connected in parallel between the EMI filter 322 and a capacitor C1, which will be described later.

In the first full bridge circuit, the first leg 342 may be connected to the AC power input line L1, and the second leg 344 may be connected to the AC power input line L2 and the neutral line N. Which of the AC power input line L2 and the neutral line N connected to the second leg 344 may be determined based on the on/off of the switch S1 provided at the inputter 312. The AC power input line L2 may be connected to the second leg 344 when the switch S1 is turned off and the neutral line N may be connected to the second leg 344 when the switch S1 is turned on.

In the second full bridge circuit, the third leg 346 may be connected to the AC power input line L1 via the switch S3, and the fourth leg 348 may be connected to the AC power input line L2 and the neutral line N via the switch S4 and to the AC power input line L3 via the switch S2. Thus, when the switch S2 is turned off and the switch S3 is turned on, the third leg 346 may be connected to the AC power input line L1. Which of the AC power input line L2 and the neutral line N connected to the leg 348 may be determined based on the on/off of the switch S1 provided at the inputter 312. The AC power input line L2 may be connected to the fourth leg 348 when the switch S1 is turned off and the neutral line N may be connected to the fourth leg 348 when the switch S1 is turned on. Conversely, when the switch S2 is turned on, the fourth leg 348 may be connected to the AC power input line L3, and when the switch S4 is turned on in this state, the second leg 344 of the first full bridge circuit may also be connected to the AC power input line L3.

A first end of the other switch S5 may be connected to a node where the third leg 346 of the second full bridge circuit and the switch S3 are connected, a second end of the switch S5 may be connected between the switching elements QC and QF of the inverter 206 to be described later. When the switches S3 and S5 are both turned on, the AC power input line L1 and the first leg 342 may be connected between the switching elements QC and QF of the inverter 206. Alternatively, when the switch S3 is turned off and the switch S5 is turned on, only the third leg 346 of the second full bridge circuit may be connected between the switching elements QC and QF of the inverter 206. The boost power factor corrector 314 may include the capacitor C1 which is a PFC link capacitor described above. The capacitor C1 may be disposed between both ends of the first full bridge circuit and the second full bridge circuit.

Switches S6 and S7 may be further included in the boost power factor corrector 314. The switch S6 may be disposed between an upper end of each of the first full bridge circuit and the second full bridge circuit and a positive (+) electrode of the capacitor C1, and may also be connected in parallel to a power factor correction element P1. The switch S7 may be disposed at both ends of the capacitor C1, and may electrically interconnect the boost power factor corrector 314 and the power relay assembly 316 to be described later. In other words, the boost power factor corrector 314 may be electrically connected to the power relay assembly 316 via the switch S7. The boost power factor corrector 314 may also be electrically connected to both ends of the high-voltage battery 102 via the switch S7.

Capacitors CY1 and CY2, each of which acts as an equivalent modeling capacitor Y, may be connected in series to the power relay assembly 316. A node through which the capacitors CY1 and CY2 are interconnected may be grounded. Two switches BS1 and BS2 and a single power factor element P2 may be disposed between the capacitor CY1 and the positive (+) electrode of the high-voltage battery 102. The switch BS1 and the power factor element P1 may be connected in series between the capacitor CY1 and the positive (+) electrode of the high-voltage battery 102, and the switch BS2 may be connected in parallel to this serial connection structure.

The switch BS3 may be disposed between the capacitor CY2 and a negative (−) electrode of the high-voltage battery 102. The inverter 206 may include six switching elements QA, QB, QC, QD, QE, and QF. A current generated by the switching elements QC and QF, a current generated by the switching elements QB and QE, and a current generated by the switching elements QA and QD may be respectively transmitted to three-phase coils of the motor 212.

The plurality of switches S1, S2, S3, S4, S5, S6, S7, BS1, BS2, and BS3 included in a switch network provided in the OBC 202 may be operated by the controller 210 shown in FIG. 2, and may be turned on or off. According to the exemplary embodiment of the present disclosure, the high-voltage battery 102 may be charged with various types of AC power through various on/off combinations of the plurality of switches S1, S2, S3, S4, S5, S6, S7, BS1, BS2, and BS3 included in the switch network. Various types of AC power may hereinafter be described with reference to FIGS. 4A-4C.

Turn-on operation and turn-off operation of the switches S1, S2, S3, S4, S5, S6, S7, BS1, BS2, and BS3 shown in FIG. 3 may be operated by the controller 210, and turn-on operation and turn-off operation of the switching elements Q1, Q2, Q3, Q4, Q5, Q6, Q7, Q8, QA, QB, QC, QD, QE, and QF shown in FIG. 3 may also be operated by the controller 210.

Figure 4A:
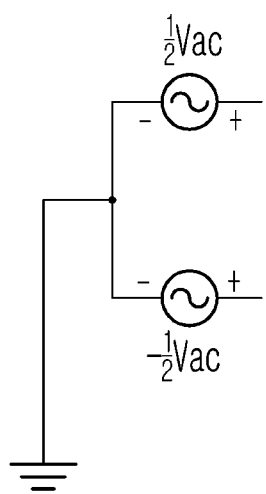
FIGS. 4A-4C are views illustrating various types of power sources embedded in the OBC according to an exemplary embodiment of the present disclosure.
Figure 4B:
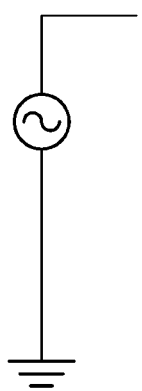
Figure 4C:
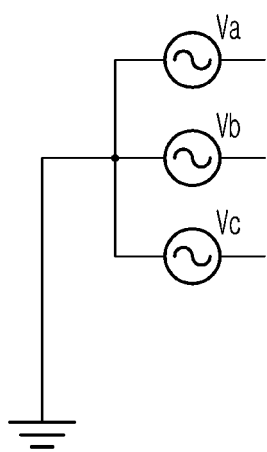

FIGS. 4A-4C are views illustrating various types of power sources embedded in the OBC according to an exemplary embodiment of the present disclosure. FIG. 4A is a view illustrating a bi-phase symmetric power source. Referring to FIG. 4A, the bi-phase symmetric power source may allow a power-supply voltage to be divided into two voltages ½ Vac and −½ Vac. Since the two voltages ½ Vac and −½ Vac may have opposite phases, the two voltages may be referred to as a bi-phase symmetric power source. The bi-phase symmetric power source shown in FIG. 4A is mainly used in North America.

FIG. 4B is a view illustrating a single-phase asymmetric power source. Referring to FIG. 4B, the single-phase asymmetric power source may provide a power-supply voltage formed in a single voltage (Vac) having a single phase. Since the single voltage (Vac) has a single phase, the single voltage (Vac) may be referred to as a single-phase asymmetric power source. The single-phase asymmetric power-supply shown in FIG. 4B is mainly used in Korea, North America, and Europe.

FIG. 4C is a view illustrating a three-phase symmetric power source. Referring to FIG. 4C, the three-phase asymmetric power source may allow a power-supply voltage to be divided into three voltages Va, Vb, and Vc. Since the three voltages Va, Vb, and Vc may have different phases, the three voltages may be referred to as a three-phase asymmetric power source. The three-phase asymmetric power source shown in FIG. 4C is mainly used in Europe.

The type of AC power source used vary according to country as described above, such that the OBC 202 according to the exemplary embodiment aims to cope with various types of AC power of individual counties through the on/off combinations of the switch network. For example, for the bi-phase symmetric power source, a boost power factor corrector formed in a single-phase full bridge inverter type is implemented, such that the high-voltage battery 102 may be charged with power. For the single-phase asymmetric power source, a boost power factor corrector formed in a single-phase full bridge inverter type is implemented along with a buck converter, such that the high-voltage battery 102 may also be charged with power. For the three-phase symmetric power source, a three-leg boost power factor corrector is implemented along with a motor/inverter buck converter, such that the high-voltage battery 102 may be charged.

Figure 5:
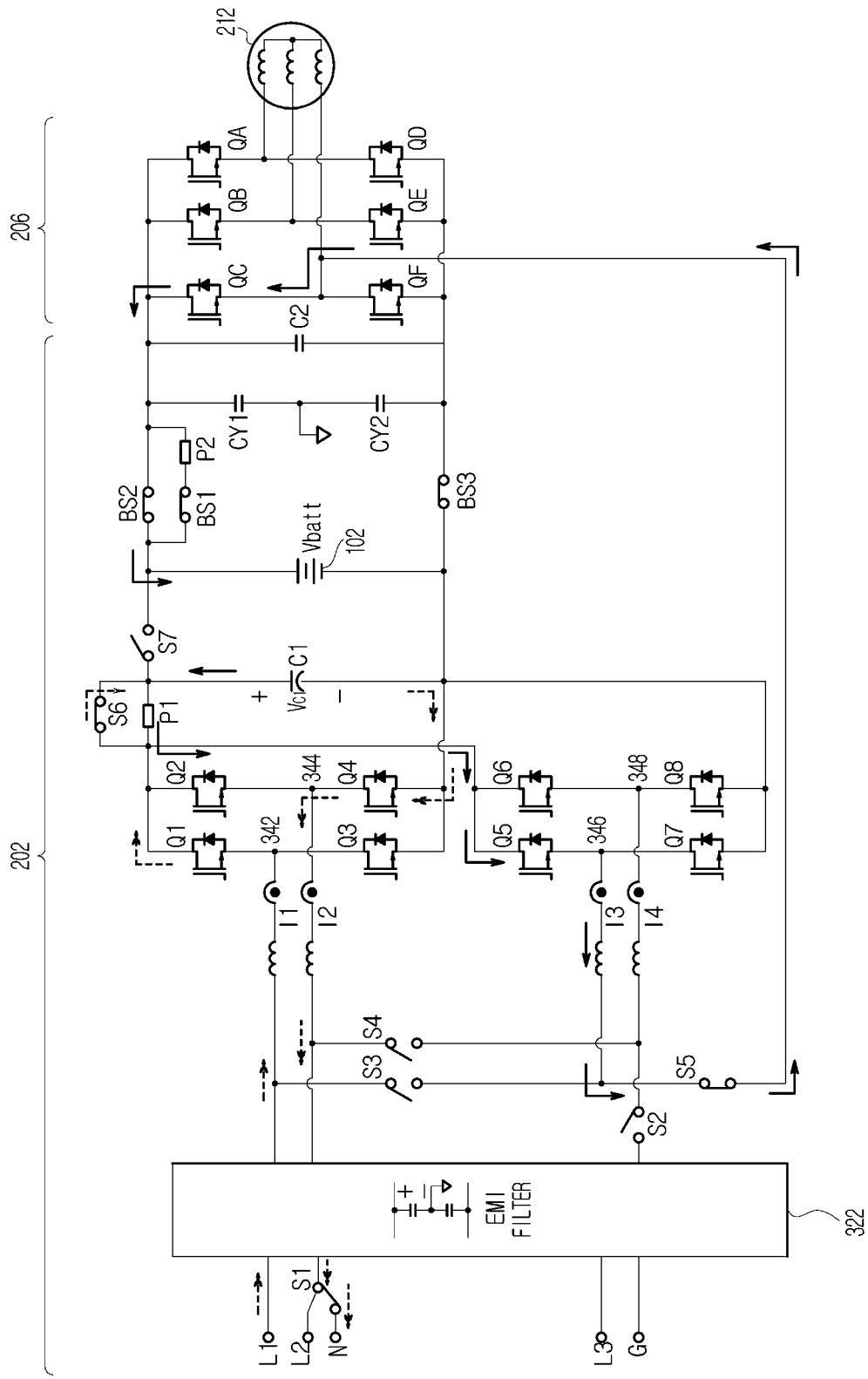
FIG. 5 is a view illustrating on/off combinations of a switch network coping with a bi-phase symmetrical power source for use in North America according to an exemplary embodiment of the present disclosure.
Figure 6:
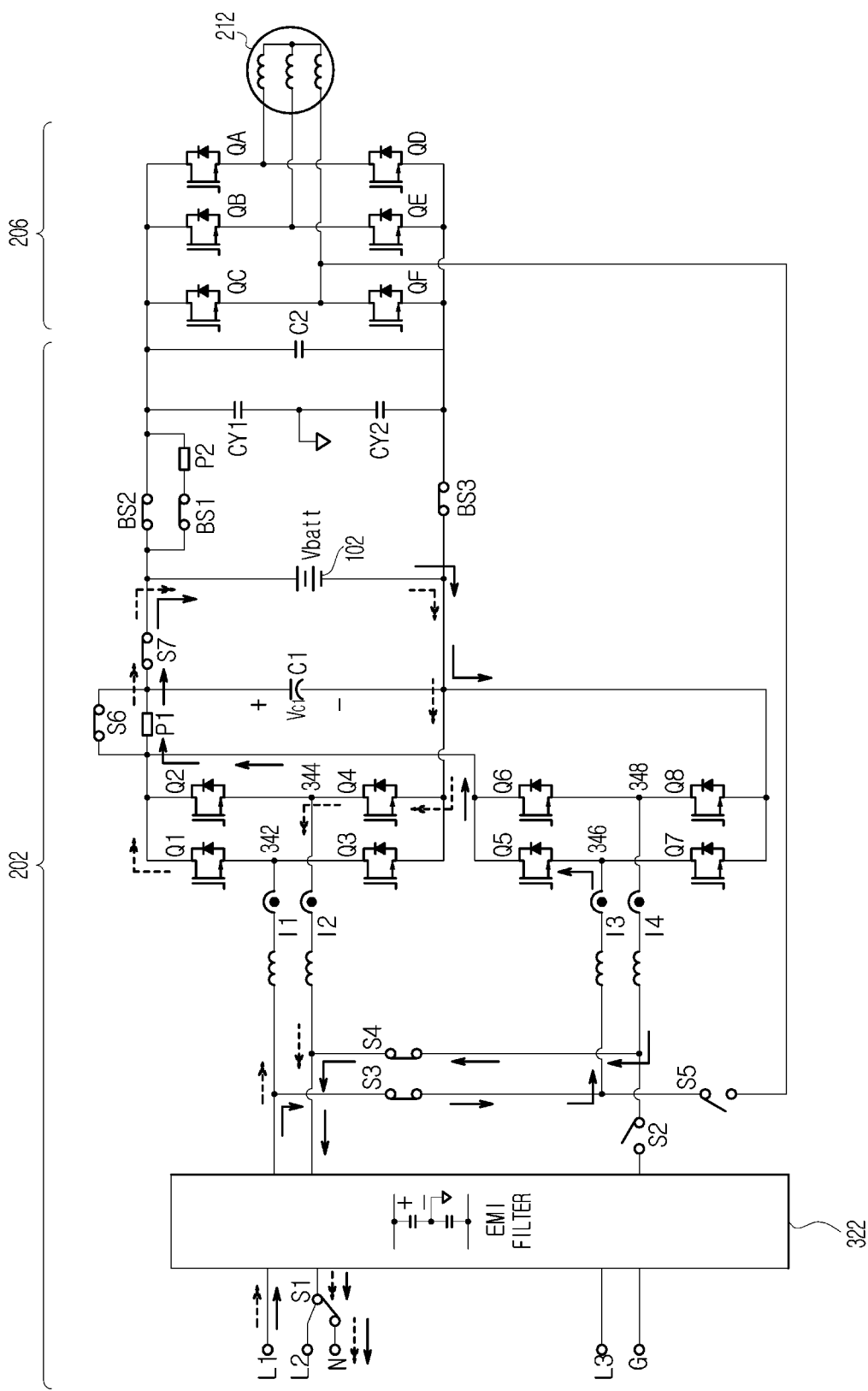
FIG. 6 is a view illustrating on/off combinations of a switch network coping with a bi-phase symmetrical power source for use in North America according to an exemplary embodiment of the present disclosure.

FIGS. 5 to 12 are views illustrating on/off combinations of a switch network coping with various types of AC power sources for use in various countries. FIGS. 5 and 6 are views illustrating on/off combinations of the switch network coping with a bi-phase symmetrical power source for use in North America. Specifically, FIG. 5 is a view illustrating a method for controlling the switch network when a peak value of a voltage (Vc1) of the capacitor C1 is greater than a charge request voltage (Vbatt) of the high-voltage battery 102. FIG. 6 is a view illustrating a method for controlling the switch network when a peak value of the voltage (Vc1) of the capacitor C1 is less than the charge request voltage (Vbatt) of the high-voltage battery 102.

Figure 7:
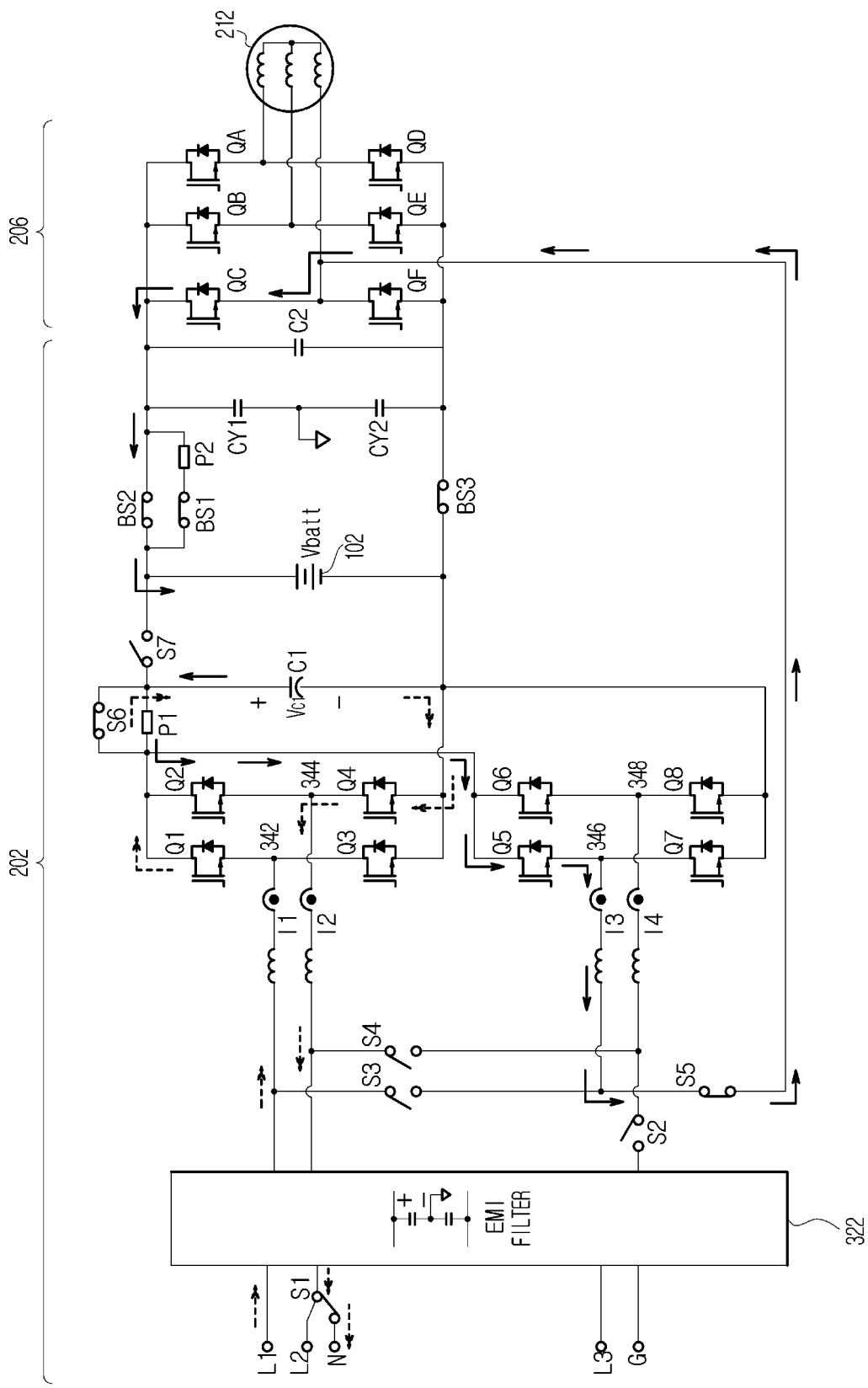
FIG. 7 is a view illustrating on/off combinations of a switch network coping with a single-phase asymmetrical power source for use in North America according to an exemplary embodiment of the present disclosure.
Figure 8:
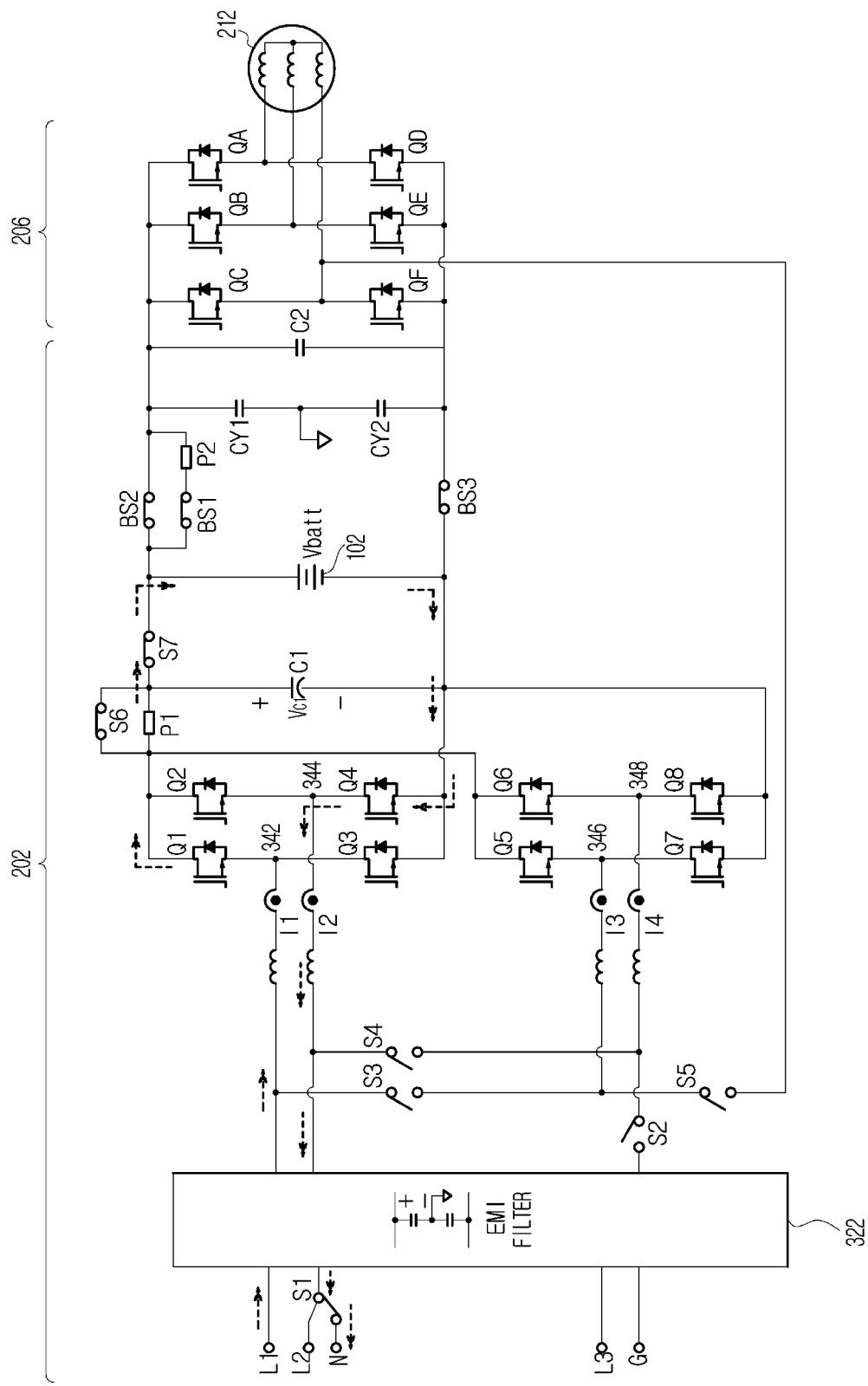
FIG. 8 is a view illustrating on/off combinations of a switch network coping with a single-phase asymmetrical power source for use in North America according to an exemplary embodiment of the present disclosure.

FIGS. 7 and 8 are views illustrating on/off combinations of the switch network coping with a single-phase asymmetrical power source for use in North America. Specifically, FIG. 7 is a view illustrating a method for controlling the switch network when a peak value of the voltage (Vc1) of the capacitor C1 is significantly less than the charge request voltage (Vbatt) of the high-voltage battery 102. FIG. 8 is a view illustrating a method for controlling the switch network when a peak value of the voltage (Vc1) of the capacitor C1 is less than the charge request voltage (Vbatt) of the high-voltage battery 102.

Figure 9A:
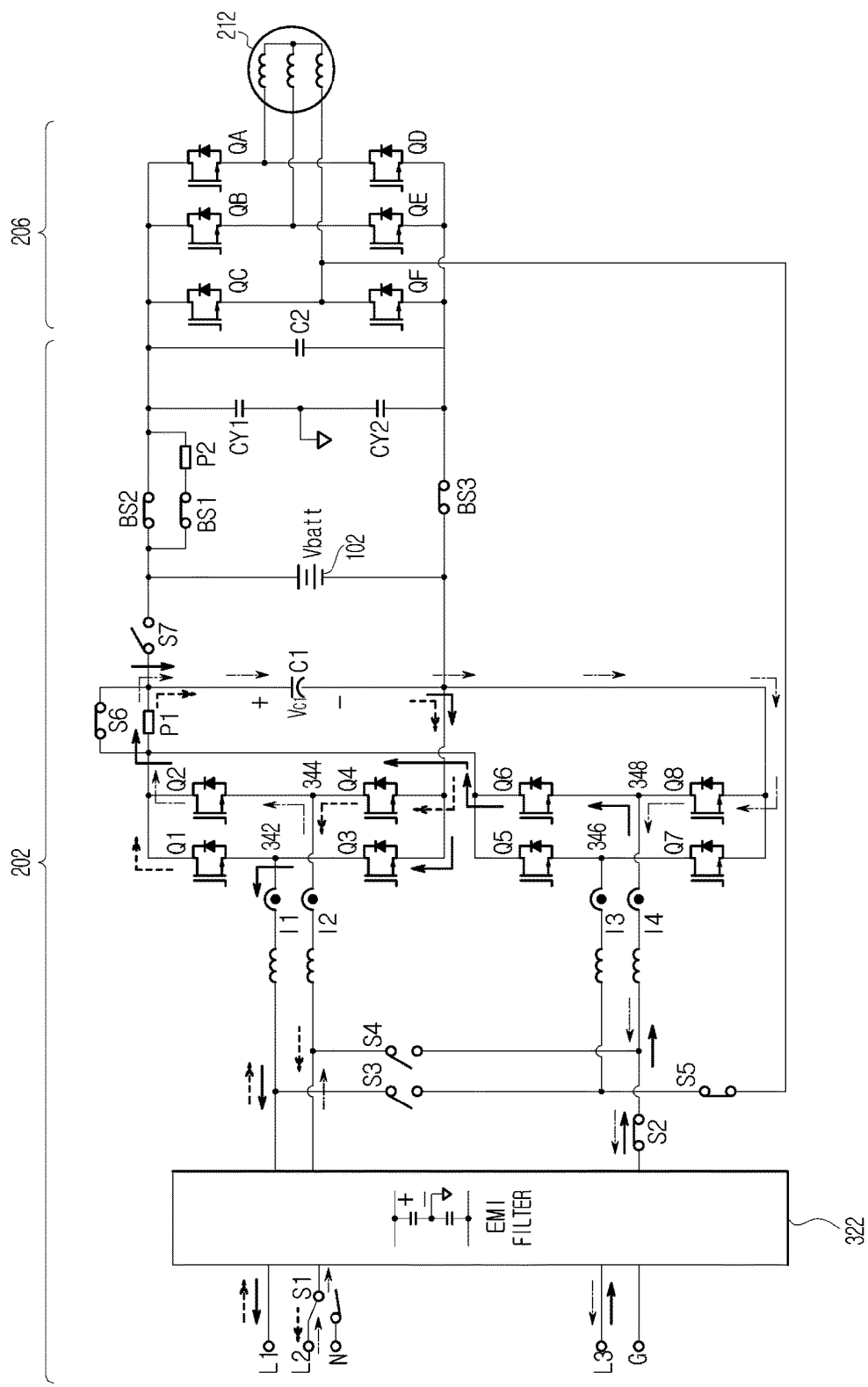
FIGS. 9A and 9B are views illustrating on/off combinations of a switch network coping with a three-phase symmetrical power source for use in Europe according to an exemplary embodiment of the present disclosure.
Figure 9B:
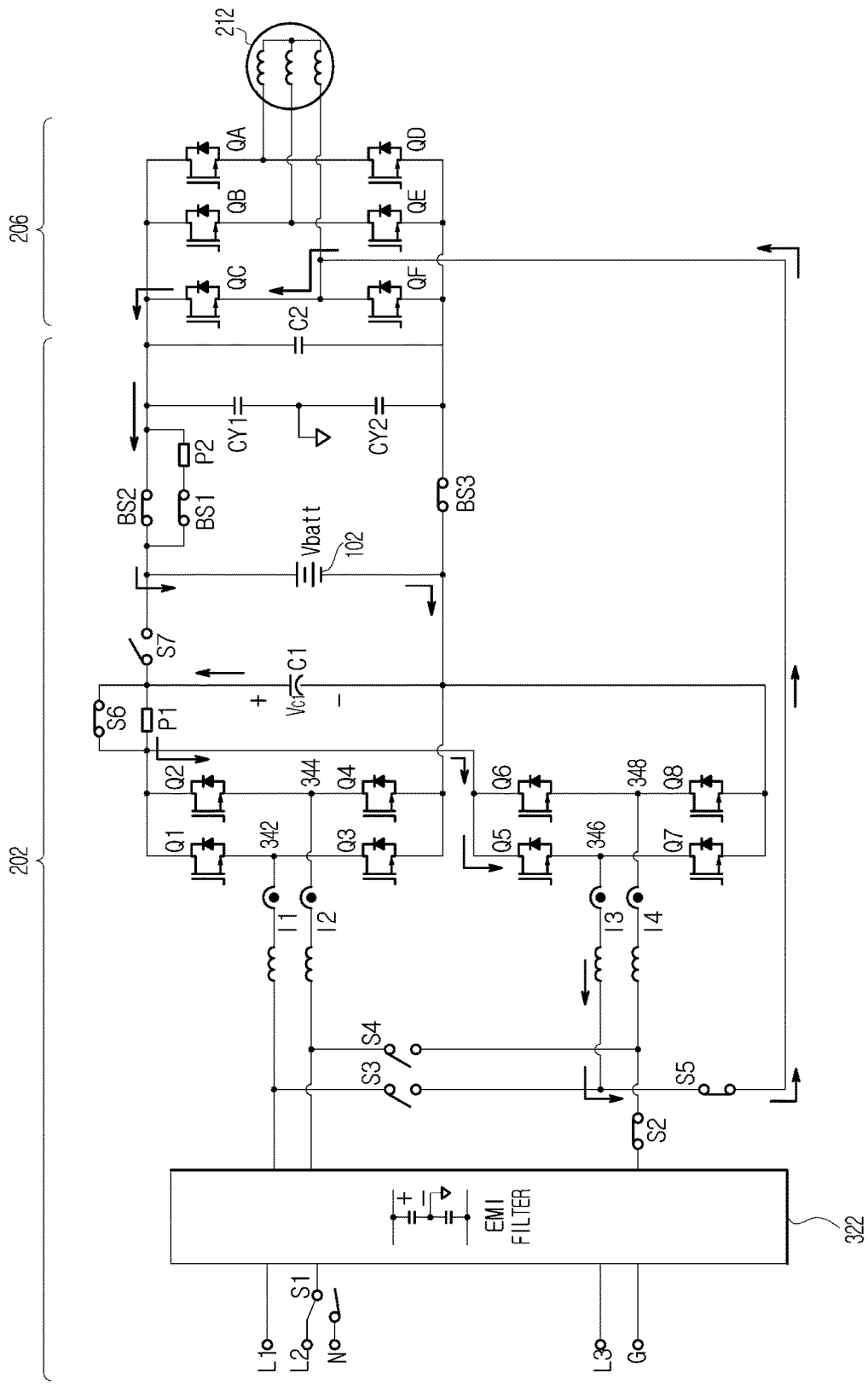
Figure 10:
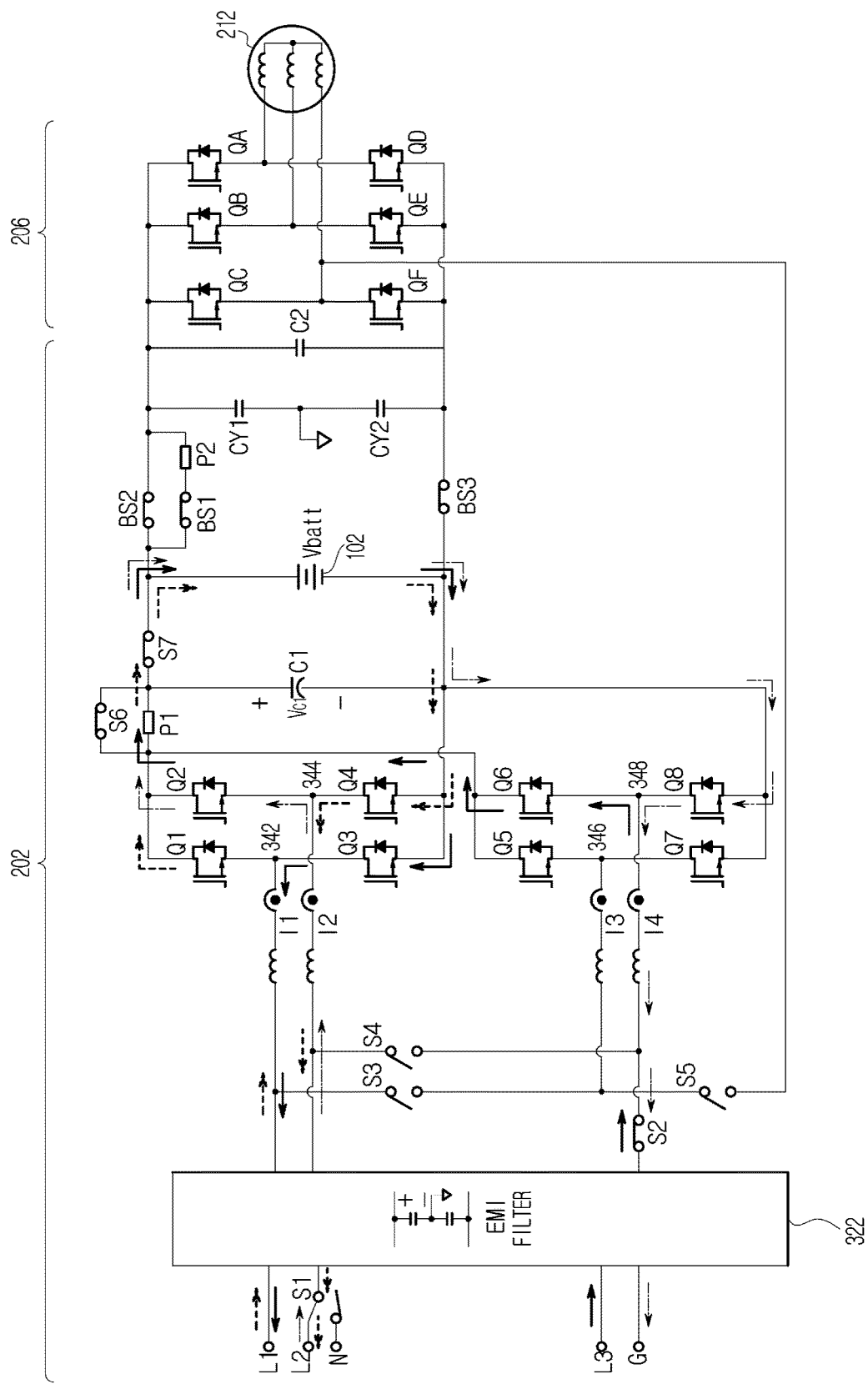
FIG. 10 is a view illustrating on/off combinations of a switch network coping with a three-phase symmetrical power source for use in Europe according to an exemplary embodiment of the present disclosure.

FIGS. 9 and 10 are views illustrating on/off combinations of the switch network coping with a three-phase symmetrical power source for use in Europe. Specifically, FIG. 9 is a view illustrating a method for controlling the switch network when a peak value of the voltage (Vc1) of the capacitor C1 is greater than the charge request voltage (Vbatt) of the high-voltage battery 102. FIG. 10 is a view illustrating a method for controlling the switch network when a peak value of the voltage (Vc1) of the capacitor C1 is less than the charge request voltage (Vbatt) of the high-voltage battery 102.

Figure 11:
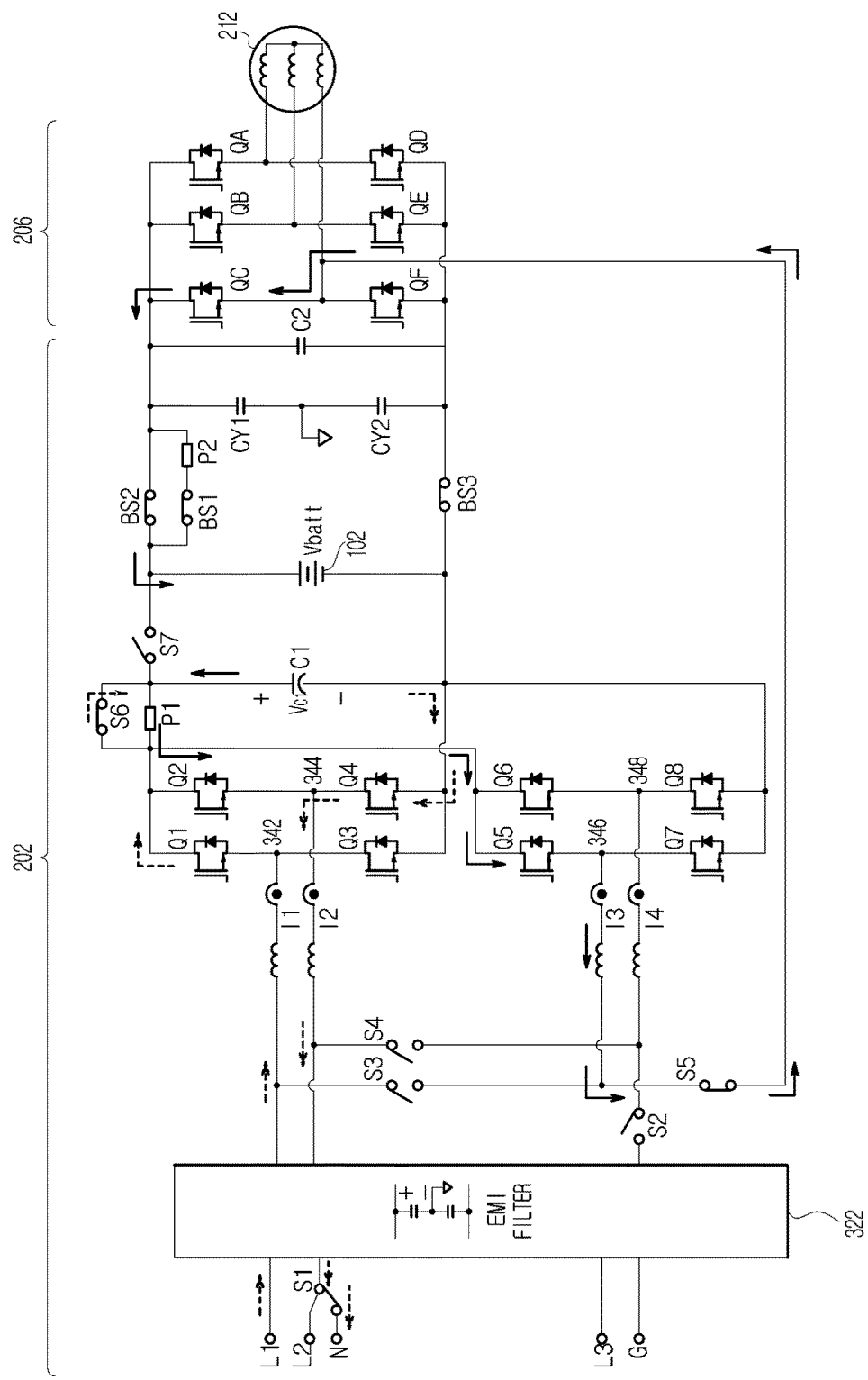
FIG. 11 is a view illustrating on/off combinations of a switch network coping with a single-phase asymmetrical power source for use in Korea and Europe according to an exemplary embodiment of the present disclosure.
Figure 12:
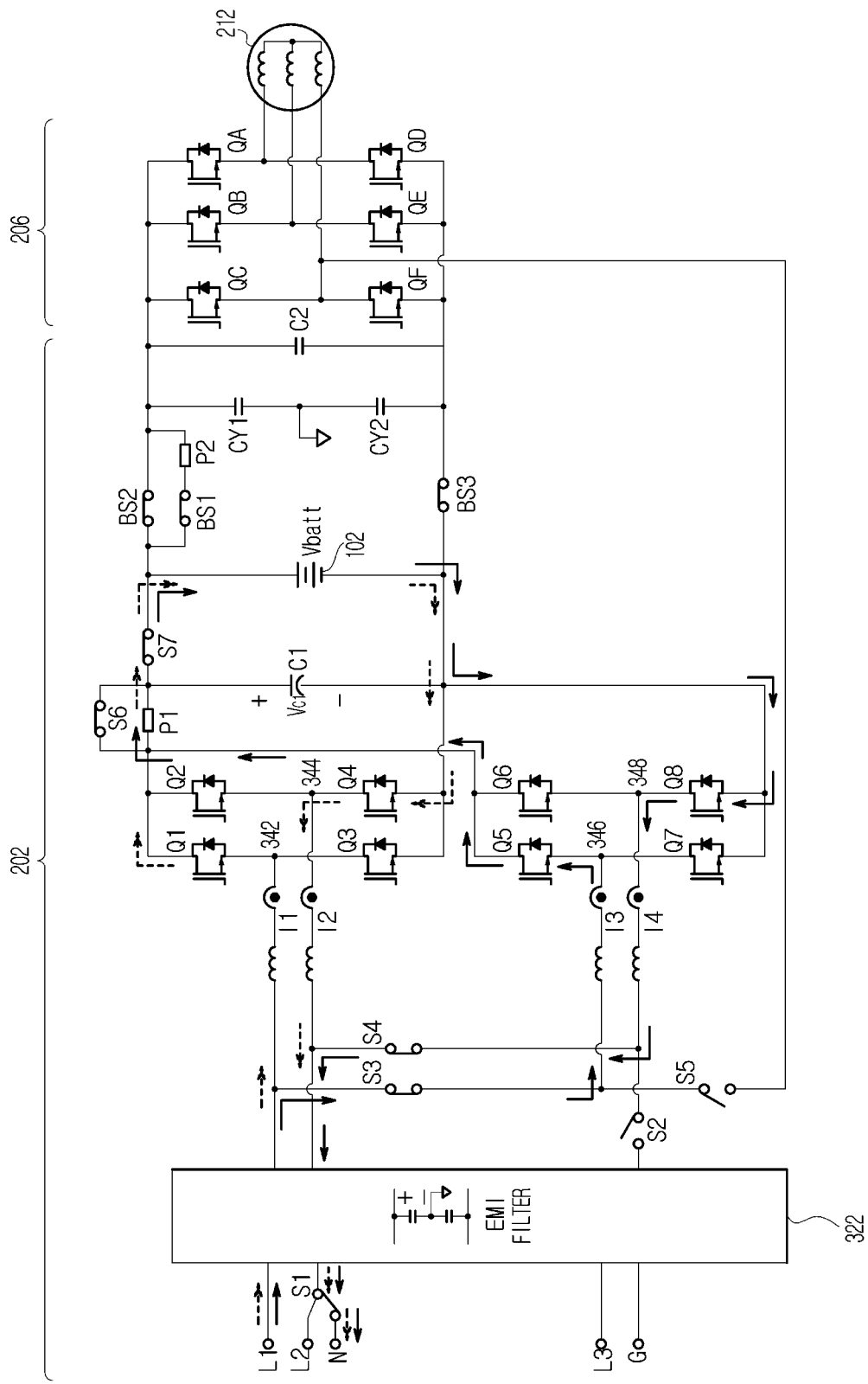
FIG. 12 is a view illustrating on/off combinations of a switch network coping with a single-phase asymmetrical power source for use in Korea and Europe according to an exemplary embodiment of the present disclosure.

FIGS. 11 and 12 are views illustrating on/off combinations of the switch network coping with the single-phase asymmetrical power source for use in Korea and Europe. Specifically, FIG. 11 is a view illustrating a method for controlling the switch network when a peak value of the voltage (Vc1) of the capacitor C1 is greater than the charge request voltage (Vbatt) of the high-voltage battery 102. FIG. 12 is a view illustrating a method for controlling the switch network when a peak value of the voltage (Vc1) of the capacitor C1 is less than the charge request voltage (Vbatt) of the high-voltage battery 102.

FIG. 5 is a view illustrating on/off combinations of the switch network coping with the bi-phase symmetrical power source for use in North America. Specifically, FIG. 5 is a view illustrating a method for controlling the switch network when the peak voltage of the voltage (Vc1) of the capacitor C1 is greater than the charge request voltage (Vbatt) of the high-voltage battery 102. In FIG. 5, the on/off combinations of the respective switches S1, S2, S3, S4, S5, S6, S7, BS1, BS2, and BS3 for use in the switch network are as follows.

S1: ON, S2: OFF, S3: OFF, S4: OFF, S5: ON, S6: ON, S7: OFF

BS1: ON, BS2: ON, BS3: ON

The switch S1 may be turned on to connect the neutral line N to the EMI filter 322, such that bi-phase symmetric AC power may be input to the electric vehicle through the AC power input line L1 and the neutral line N. All of the switches S2, S3, and S4 may be turned off o disconnect the AC power input lines L1, L2, and L3 from the legs 346 and 348 of the second full bridge circuit. However, since the switches S5 and S6 are turned on, the third leg 346 of the second full bridge circuit and the inverter 206 may be connected. The switch S7 may be turned off. In addition, the switching elements Q1, Q4, and Q5 of the boost power factor corrector 314 and a switching element QC of the inverter 206 may be turned on. The switching element QC of the inverter 206 may maintain a turn-on operation at all times.

In FIG. 5, by the above-mentioned on/off combinations of the switch network, the capacitor C1 may be charged through the first full bridge circuit along a path denoted by a dotted arrow in FIG. 5. A charge voltage of the capacitor C1 may charge the high-voltage battery 102 through the second full bridge circuit and the inverter 206 along a path denoted by a solid arrow in FIG. 5. The operation for charging the high-voltage battery 102 by the charging voltage of the capacitor C1 is performed since a peak voltage of the voltage (Vc1) of the capacitor C1 is greater than the charge request voltage (Vbatt) of the high-voltage battery 102.

Since a single-phase full-bridge-inverter-type boost power factor corrector and a buck converter mode are implemented by the above-mentioned on/off combinations of the switch network, the implementation result may be responsive to the bi-phase symmetric power source used in North America.

FIG. 6 is a view illustrating on/off combinations of the switch network coping with the bi-phase symmetrical power source for use in North America. Specifically, FIG. 6 is a view illustrating a method for controlling the switch network when the peak voltage of the voltage (Vc1) of the capacitor C1 is less than the charge request voltage (Vbatt) of the high-voltage battery 102. In FIG. 6, the on/off combinations of the respective switches S1, S2, S3, S4, S5, S6, S7, BS1, BS2, and BS3 for use in the switch network are as follows.

S1: ON, S2: OFF, S3: ON, S4: ON, S5: OFF, S6: ON, S7: ON

BS1: ON, BS2: ON, BS3: ON

The switch S1 may be turned on to connect the neutral line N to the EMI filter 322, to allow the bi-phase symmetric AC power to be input to the electric vehicle through the AC power input line L1 and the neutral line N. The switches S2 and S5 may be turned off, and the switches S3, S4, S6, and S7 may be turned on. As a result, the third leg 346 of the second full bridge circuit may be connected to the AC power input line L1 via the switches S3 and S4, and the fourth leg 348 may be connected to the neutral line N. In addition, the switching elements Q1, Q4, Q5, and Q8 of the boost power factor corrector 314 may be turned on.

By the above-mentioned on/off combinations of the switch network, the high-voltage battery 102 may be directly charged through the first full bridge circuit along a path denoted by a dotted arrow in FIG. 6. The high-voltage battery 102 may be directly charged through the second full bridge circuit along a path denoted by a solid arrow in FIG. 6. The operation for charging the high-voltage battery 102 by the bi-phase symmetric AC power received through the EMI filter 322 may be performed since the peak voltage of the voltage (Vc1) of the capacitor C1 is less than the charge request voltage (Vbatt) of the high-voltage battery 102. Since a single-phase full-bridge-inverter-type boost power factor corrector is implemented by the above-mentioned on/off combinations of the switch network, the implementation result may be responsive to the bi-phase symmetric power source used in North America.

FIG. 7 is a view illustrating on/off combinations of the switch network coping with the single-phase asymmetrical power source for use in North America. Specifically, FIG. 7 is a view illustrating a method for controlling the switch network when the peak voltage of the voltage (Vc1) of the capacitor C1 is substantially less than the charge request voltage (Vbatt) of the high-voltage battery 102. In FIG. 7, the on/off combinations of the respective switches S1, S2, S3, S4, S5, S6, S7, BS1, BS2, and BS3 for use in the switch network are as follows.

S1: ON, S2: OFF, S3: OFF, S4: OFF, S5: ON, S6: ON, S7: OFF

BS1: ON, BS2: ON, BS3: ON

The switch S1 may be turned on to connect the neutral line N to the EMI filter 322, to allow the bi-phase symmetric AC power to be input to the electric vehicle through the AC power input line L1 and the neutral line N. All of the switches S2, S3, and S4 may be turned off so that the AC power input lines L1, L2, and L3 may be disconnected from the legs 346 and 348 of the second full bridge circuit. However, since the switches S5 and S6 are turned on, the third leg 346 of the second full bridge circuit and the inverter 206 may be connected. The switch S7 may be turned off. In addition, the switching elements Q1, Q4, and Q5 of the boost power factor corrector 314 and a switching element QC of the inverter 206 may be turned on. The switching element Q5 of the second full bridge circuit may maintain a turn-on operation at all times.

By the above-mentioned on/off combinations of the switch network, the capacitor C1 may be charged through the first full bridge circuit along a path denoted by a dotted arrow in FIG. 7. A charge voltage of the capacitor C1 may charge the high-voltage battery 102 through the second full bridge circuit and the inverter 206 along a path denoted by a solid arrow in FIG. 7. The operation for charging the high-voltage battery 102 by the charging voltage of the capacitor C1 may be performed since a peak voltage of the voltage (Vc1) of the capacitor C1 is less than the charge request voltage (Vbatt) of the high-voltage battery 102. Since a single-phase full-bridge-inverter-type boost power factor corrector and a buck converter mode are implemented by the above-mentioned on/off combinations of the switch network, the implementation result may be responsive to the single-phase asymmetrical power source used in North America.

FIG. 8 is a view illustrating on/off combinations of the switch network coping with the single-phase asymmetrical power source for use in North America. Specifically, FIG. 8 is a view illustrating a method for controlling the switch network when the peak voltage of the voltage (Vc1) of the capacitor C1 is less than the charge request voltage (Vbatt) of the high-voltage battery 102. In FIG. 8, the on/off combinations of the respective switches S1, S2, S3, S4, S5, S6, S7, BS1, BS2, and BS3 for use in the switch network are as follows.

S1: ON, S2: OFF, S3: OFF, S4: OFF, S5: OFF, S6: ON, S7: ON

BS1: ON, BS2: ON, BS3: ON

The switch S1 may be turned on to connect the neutral line N to the EMI filter 322, to allow the bi-phase symmetric AC power to be input to the electric vehicle through the AC power input line L1 and the neutral line N. The switches S2, S3, S4, and S5 may be turned off, and the switches S6 and S7 may be turned on. As a result, the first leg 342 of the first full bridge circuit may be connected to the AC power input line L1, and the second leg 344 may be connected to the neutral line N. In addition, the switching elements Q1 and Q4 of the boost power factor corrector 314 may be turned on.

By the above-mentioned on/off combinations of the switch network, the high-voltage battery 102 may be directly charged along a path denoted by a dotted arrow in FIG. 8. The operation for charging the high-voltage battery 102 by the bi-phase symmetric AC power received through the EMI filter 322 may be performed since the peak voltage of the voltage (Vc1) of the capacitor C1 is less than the charge request voltage (Vbatt) of the high-voltage battery 102. Since a single-phase full-bridge-inverter-type boost power factor corrector is implemented by the above-mentioned on/off combinations of the switch network, the implementation result may be responsive to the single-phase asymmetrical power source used in North America.

FIGS. 9A and 9B are views illustrating on/off combinations of the switch network coping with the three-phase symmetrical power source for use in Europe. Specifically, FIGS. 9A and 9B are views illustrating a method for controlling the switch network when the peak voltage of the voltage (Vc1) of the capacitor C1 is greater than the charge request voltage (Vbatt) of the high-voltage battery 102. In FIG. 9, the on/off combinations of the respective switches S1, S2, S3, S4, S5, S6, S7, BS1, BS2, and BS3 for use in the switch network are as follows.

S1: OFF, S2: ON, S3: OFF, S4: OFF, S5: ON, S6: ON, S7: OFF

BS1: ON, BS2: ON, BS3: ON

The switch S1 may be turned on to connect the AC power input line L2 to the EMI filter 322. The switches S3, S4, and S7 may be turned off, and the switches S3 and S4 may be turned on. The switches S3 and S4 may be turned off, to connect the AC power input line L1 to the first leg 342 of the first full bridge circuit, and connect the AC power input line L2 to the second leg 344 (i.e., not connected to the second full bridge circuit). Additionally, the switches S2, S5, and S6 may be turned on, to connect the third leg 346 of the second full bridge circuit to the inverter 206, and connect the fourth leg 348 to the AC power input line L3.

In FIG. 9A, a dotted arrow indicates a flow of one phase of power input through the AC power input line L1 among the three-phase AC power, a one-dot chain line arrow indicates a flow of one phase of power input through the AC power input line L2 among the three-phase AC power, and the two-dot chain line arrow indicates a flow of one phase of power input through the AC power input line L3 among the three-phase AC power. The capacitor C1 may be charged by such three-phase AC power. In FIG. 9B, a solid arrow indicates a path through which the high-voltage battery 102 is charged by the power charged in the capacitor C1. Accordingly, the switching elements Q1, Q2, Q3, Q4, Q5, Q6, and Q8 of the boost power factor corrector 414 and the switching element QB of the inverter 206 may be selectively turned on for each phase input.

By the above-mentioned on/off combinations of the switch network, the capacitor C1 may be charged along a path denoted by a dotted arrow in FIG. 9A. The charge voltage of the capacitor C1 may charge the high-voltage battery 102 through the inverter 206 along a path denoted by a solid arrow in FIG. 9B. The operation for charging the high-voltage battery 102 by the charge voltage of the capacitor C1 may be performed since the peak voltage of the voltage (Vc1) of the capacitor C1 is greater than the charge request voltage (Vbatt) of the high-voltage battery 102.

By the above-mentioned on/off combinations of the switch network, the three-phase boost power factor corrector and the buck converter mode may be implemented using a single phase-to-phase voltage (i.e., a single line-to-line voltage), such that the implementation result may be responsive to the three-phase symmetric power source used in Europe.

FIG. 10 is a view illustrating on/off combinations of the switch network coping with the three-phase symmetrical power source for use in Europe. Specifically, FIG. 10 is a view illustrating a method for controlling the switch network when the peak voltage of the voltage (Vc1) of the capacitor C1 is less than the charge request voltage (Vbatt) of the high-voltage battery 102. In FIG. 10, the on/off combinations of the respective switches S1, S2, S3, S4, S5, S6, S7, BS1, BS2, and BS3 for use in the switch network are as follows.

S1: OFF, S2: ON, S3: OFF, S4: OFF, S5: OFF, S6: ON, S7: ON

BS1: ON, BS2: ON, BS3: ON

The switch S1 may be turned on to connect the AC power input line L2 to the EMI filter 322. The switches S3, S4, and S5 may be turned off, and the switches S2, S6, and S7 may be turned on. The switches S3 and S4 may be turned off, to connect the AC power input line L1 to the first leg 342 of the first full bridge circuit, and connect the AC power input line L2 to the second leg 344 (i.e., not connected to the second full bridge circuit). Additionally, the switches S2, S6, and S7 may be turned on, to connect the fourth leg 348 of the second full bridge circuit to the AC power input line L3.

In FIG. 10, a dotted arrow indicates a flow of one phase of power input through the AC power input line L1 among the three-phase AC power, a one-dot chain line arrow indicates a flow of one phase of power input through the AC power input line L2 among the three-phase AC power, and the two-dot chain line arrow indicates a flow of one phase of power input through the AC power input line L3 among the three-phase AC power. The capacitor C1 may be charged by such three-phase AC power.

By the above-mentioned on/off combinations of the switch network, the high-voltage battery 102 may be directly charged along a path denoted FIG. 10. The operation for charging the high-voltage battery 102 by the three-phase symmetric AC power received through the EMI filter 322 may be performed since the peak voltage of the voltage (Vc1) of the capacitor C1 is less than the charge request voltage (Vbatt) of the high-voltage battery 102. Since the three-phase boost power factor corrector may be implemented by the above-mentioned on/off combinations of the switch network, the implementation result may be response to the three-phase symmetric power source used in Europe.

FIG. 11 is a view illustrating on/off combinations of the switch network coping with the single-phase asymmetrical power source for use in Korea and Europe. Specifically, FIG. 11 is a view illustrating a method for controlling the switch network when the peak voltage of the voltage (Vc1) of the capacitor C1 is greater than the charge request voltage (Vbatt) of the high-voltage battery 102. In FIG. 11, the on/off combinations of the respective switches S1, S2, S3, S4, S5, S6, S7, BS1, BS2, and BS3 for use in the switch network are as follows.

S1: ON, S2: OFF, S3: OFF, S4: OFF, S5: ON, S6: ON, S7: OFF

BS1: ON, BS2: ON, BS3: ON

The switch S1 may be turned on to connect the neutral line N to the EMI filter 322, to allow single-phase asymmetrical AC power to be input to the electric vehicle through the AC power input line L1 and the neutral line N. All of the switches S2, S3, and S4 may be turned off to disconnect the AC power input lines L1, L2, and L3 from the legs 346 and 348 of the second full bridge circuit. However, since the switches S5 and S6 are turned on, the third leg 346 of the second full bridge circuit and the inverter 206 may be connected. The switch S7 may be turned off. In addition, the switching elements Q1, Q4, and Q5 of the boost power factor corrector 314 and a switching element QC of the inverter 206 may be turned on. The switching element QC of the inverter 206 may maintain a turn-on operation at all times.

By the above-mentioned on/off combinations of the switch network, the capacitor C1 may be charged through the first full bridge circuit along a path denoted by a dotted arrow in FIG. 11. A charge voltage of the capacitor C1 may charge the high-voltage battery 102 through the second full bridge circuit and the inverter 206 along a path denoted by a solid arrow in FIG. 11. The operation for charging the high-voltage battery 102 by the charging voltage of the capacitor C1 may be performed since a peak voltage of the voltage (Vc1) of the capacitor C1 is greater than the charge request voltage (Vbatt) of the high-voltage battery 102.

Since a single-phase full-bridge-inverter-type boost power factor corrector and a buck converter mode are implemented by the above-mentioned on/off combinations of the switch network, the implementation result may be responsive to the single-phase asymmetric power source used in Korea and Europe.

FIG. 12 is a view illustrating on/off combinations of the switch network coping with the single-phase asymmetrical power source for use in Korea and Europe. Specifically, FIG. 12 is a view illustrating a method for controlling the switch network when the peak voltage of the voltage (Vc1) of the capacitor C1 is less than the charge request voltage (Vbatt) of the high-voltage battery 102. In FIG. 12, the on/off combinations of the respective switches S1, S2, S3, S4, S5, S6, S7, BS1, BS2, and BS3 for use in the switch network are as follows.

S1: ON, S2: OFF, S3: ON, S4: ON, S5: OFF, S6: ON, S7: ON

BS1: ON, BS2: ON, BS3: ON

The switch S1 may be turned on to connect the neutral line N to the EMI filter 322, to allow bi-phase symmetric AC power to be input to the electric vehicle through the AC power input line L1 and the neutral line N. The switches S2 and S5 may be turned off, and the switches S3, S4, S6, and S7 may be turned on. As a result, the third leg 346 of the boost power factor corrector 314 and the inverter 206 may be electrically isolated from each other. The third leg 346 of the second full bridge circuit may be connected to the AC power input line L1 and the fourth leg 348 may be connected to the neutral line N through the switches S3 and S4 that are turned on. The first leg 342 of the first full bridge circuit may also be connected to the AC power input line L1 and the second leg 344 may also be connected to the neutral line N. In addition, the switching elements Q1, Q4, Q5, and Q6 of the boost power factor corrector 314 may be turned on.

By the above-mentioned on/off combinations of the switch network, the high-voltage battery 102 may be directly charged along a path denoted by a dotted arrow in FIG. 12. The high-voltage battery 102 may be directly charged through the second full bridge circuit along a path denoted by a solid arrow in FIG. 12. The operation for charging the high-voltage battery 102 by the bi-phase symmetric AC power received through the EMI filter 322 may be performed since the peak voltage of the voltage (Vc1) of the capacitor C1 is less than the charge request voltage (Vbatt) of the high-voltage battery 102. As a result, the switch S5 may be turned off when the third leg 346 of the boost power factor corrector 314 and the inverter 206 are electrically isolated from other, such that the bi-phase symmetric AC power received through the EMI filter 322 may directly charge the high-voltage battery 102.

By the above-mentioned on/off combinations of the switch network, the single-phase full-bridge-inverter-type boost power factor corrector is implemented, such that the implementation result may be responsive to the single-phase symmetric power source used in Korea and Europe.

Figure 13:
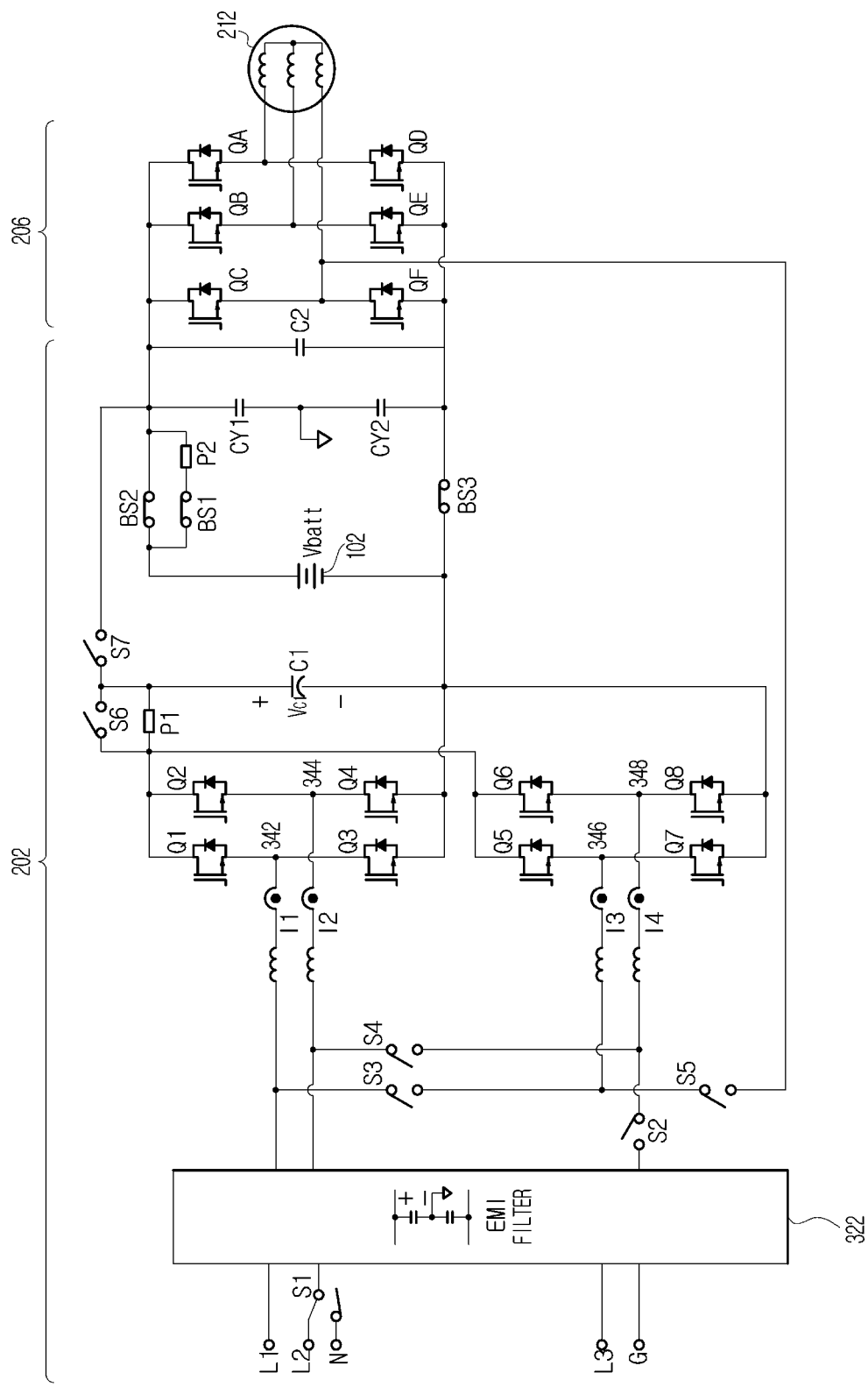
FIG. 13 is a view illustrating a first modified embodiment of the OBC according to an exemplary embodiment of the present disclosure.

FIG. 13 is a view illustrating a first modified embodiment of the OBC according to an exemplary embodiment of the present disclosure. In the first modified embodiment of the OBC shown in FIG. 13, both ends of the capacitor C1 may be disconnected from the high-voltage battery 102, and only one lower end of the capacitor C1 (e.g., a first end thereof) may be connected to the high-voltage battery 102. A second end of the capacitor C1 which is not connected to the high-voltage battery 102 may be connected to the switch BS1 and the switch BS2 of the power relay assembly 316 via the switch S7, and thus, when the asymmetrical power is input through the boost power factor corrector 314, the switch BS3 may operate as a switch for blocking leakage.

Figure 14:
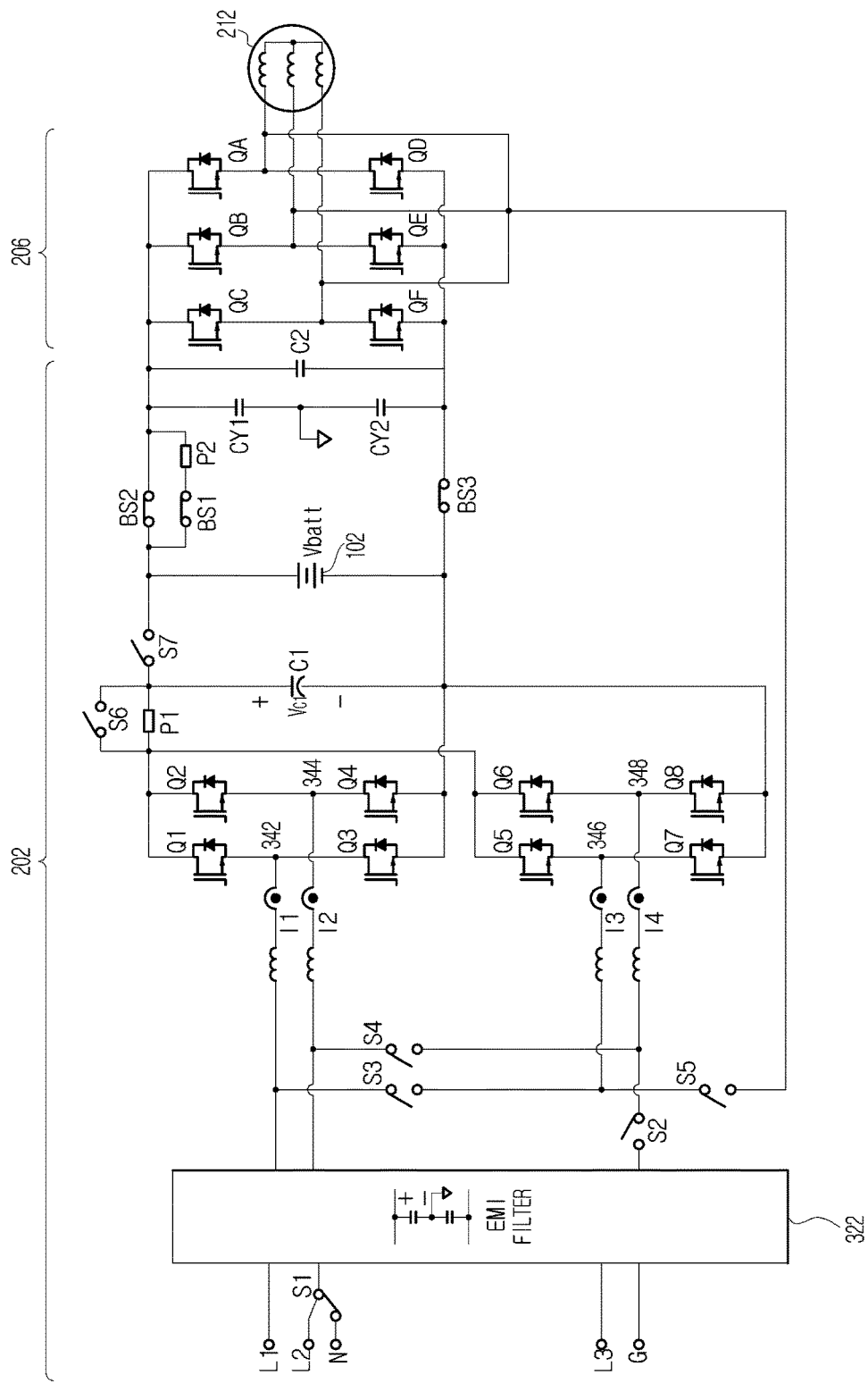
FIG. 14 is a view illustrating a second modified embodiment of the OBC according to an exemplary embodiment of the present disclosure.

FIG. 14 is a view illustrating a second modified embodiment of the OBC according to an exemplary embodiment of the present disclosure. In the second modified embodiment of the OBC shown in FIG. 14, the AC power input line L1 may be connected to all of the three legs of the inverter 206 via the switches S3 and S5. Through this structure, a plurality of full bridge buck/boost functions may be implemented using the inverter 206 for driving the motor 212.

As is apparent from the above description, the charging apparatus for the electric vehicle according to the exemplary embodiments of the present disclosure has a small-sized simplified structure, and charges the battery of the electric vehicle upon receiving various types of power sources.

It is to be understood that the above description is only illustrative of technical ideas, and various modifications, alterations, and substitutions are possible without departing from the essential characteristics of the present disclosure. Therefore, the exemplary embodiments and the accompanying drawings described above are intended to illustrate and not limit the technical idea, and the scope of technical thought is not limited by these embodiments and accompanying drawings. The scope of which is to be construed in accordance with the following claims, and all technical ideas which are within the scope of the same should be interpreted as being included in the scope of the right.

What is claimed is:

1. A charging apparatus for an electric vehicle, the charging apparatus comprising:
    a motor configured to generate a power required to drive the electric vehicle;
    an inverter configured to supply a power to the motor;
    an alternating current (AC) power input stage configured to receive at least one AC input power from among a single-phase AC power and a multi-phase AC power;
    a power factor corrector having a plurality of full bridge circuits configured to receive the at least one AC input power through the AC power input stage;
    a link capacitor to be charged through at least one combination of the power factor corrector, the motor, and the inverter;
    a switch network having a first switch for connecting any one of an AC power input line and a neutral line of the AC power input stage to the power factor corrector, and at least one second switch for selectively connecting the AC power input stage to the power factor corrector, or the link capacitor; and
    a controller configured to operate the power factor corrector and the switch network based on a condition of the at least one AC input power received through the AC power input stage.

2. The charging apparatus according to claim 1, wherein the plurality of full bridge circuits further includes:
    a first full bridge circuit and a second full bridge circuit.

3. The charging apparatus according to claim 2, wherein:
    a first leg of the first full bridge circuit is connected to a first AC power input line of the AC power input stage; and
    a second leg of the first full bridge circuit is selectively connected to any one of a second AC power input line and a neutral line of the AC power input stage through the first switch.

4. The charging apparatus according to claim 3, wherein:
    a first leg of the second full bridge circuit is connected to any one leg of three legs of the inverter via a third switch; and a second leg of the second full bridge circuit is connected to a third AC power input line of the AC power input stage via a fourth switch.

5. The charging apparatus according to claim 4, wherein the switch network further includes:
    a fifth switch disposed to connect the first leg of the first full bridge circuit and the first leg of the second full bridge circuit; and
    a sixth switch disposed to connect the second leg of the first full bridge circuit and the second leg of the second full bridge circuit.

6. The charging apparatus according to claim 5, wherein the switch network further includes:
    a seventh switch disposed to connect an end of the link capacitor to a positive electrode of a battery.

7. The charging apparatus according to claim 6, wherein the switch network further includes:
    an eighth switch disposed to connect an upper end of the first full bridge circuit and the end of the link capacitor.

8. The charging apparatus according to claim 1, wherein the condition of the at least one AC input power includes a multi-phase condition and a single-phase condition of the at least one AC input power.

9. The charging apparatus according to claim 1, wherein the condition of the at least one AC input power includes a symmetric power condition and an asymmetric power condition of the at least one AC input power.

10. A charging apparatus for an electric vehicle, the charging apparatus comprising:
    a motor configured to generate a power required to drive the electric vehicle;
    an inverter configured to supply a power to the motor;
    an alternating current (AC) power input stage configured to receive at least one AC input power from among a single-phase AC power and a multi-phase AC power;
    a power factor corrector having a first full bridge circuit and a second full bridge circuit configured to receive the at least one AC input power through the AC power input stage;
    a link capacitor to be charged through at least one combination of the power factor corrector, the motor, and the inverter;
    a switch network having a first switch for connecting any one of an AC power input line and a neutral line of the AC power input stage to the power factor corrector, and at least one second switch for selectively connecting the AC power input stage to the power factor corrector, or the link capacitor; and
    a controller configured to operate the power factor corrector and the switch network based on a condition of the at least one AC input power received through the AC power input stage,
    wherein:
    a first leg of the first full bridge circuit is connected to a first AC power input line of the AC power input stage;
    a second leg of the first full bridge circuit is selectively connected to any one of a second AC power input line and a neutral line of the AC power input stage via the first switch;
    a first leg of the second full bridge circuit is connected to any one leg of three legs of the inverter via a third switch; and
    a second leg of the second full bridge circuit is connected to a third AC power input line of the AC power input stage through a fourth switch.

11. The charging apparatus according to claim 10, wherein the switch network further includes:
    a fifth switch disposed to connect the first leg of the first full bridge circuit and the first leg of the second full bridge circuit; and
    a sixth switch disposed to connect the second leg of the first full bridge circuit and the second leg of the second full bridge circuit.

12. The charging apparatus according to claim 10, wherein the switch network further includes:
    a seventh switch disposed to connect an end of the link capacitor to a positive electrode of a battery.

13. The charging apparatus according to claim 12, wherein the switch network further includes:
    an eighth switch disposed to connect an upper end of the first full bridge circuit and the end of the link capacitor.

14. The charging apparatus according to claim 10, wherein the condition of the at least one AC input power includes a multi-phase condition and a single-phase condition of the at least one AC input power.

15. The charging apparatus according to claim 10, wherein the condition of the at least one AC input power includes a symmetric power condition and an asymmetric power condition of the at least one AC input power.

16. A charging apparatus for an electric vehicle, the charging apparatus comprising:
    a motor configured to generate a power required to drive the electric vehicle;
    an inverter configured to supply a power to the motor;
    an alternating current (AC) power input stage configured to receive at least one AC input power from among a single-phase AC power and a multi-phase AC power;
    a power factor corrector having a first full bridge circuit and a second full bridge circuit configured to receive the at least one AC input power through the AC power input stage;
    a link capacitor to be charged through at least one combination of the power factor corrector, the motor, and the inverter;
    a switch network a first switch for connecting any one of an AC power input line and a neutral line of the AC power input stage to the power factor corrector, and at least one second switch for selectively connecting the AC power input stage to the power factor corrector, or the link capacitor; and
    a controller configured to operate the power factor corrector and the switch network based on a condition of the at least one AC input power received through the AC power input stage,
    wherein:
    a first leg of the first full bridge circuit is connected to a first AC power input line of the AC power input stage;
    a second leg of the first full bridge circuit is selectively connected to any one of a second AC power input line and a neutral line of the AC power input stage through a first switch;
    a first leg of the second full bridge circuit is connected to any one leg of three legs of the inverter via a third switch; and
    a second leg of the second full bridge circuit is connected to a third AC power input line of the AC power input stage via a fourth switch,
    wherein the switch network further includes:
    a fifth switch disposed to connect the first leg of the first full bridge circuit and the first leg of the second full bridge circuit;
    a sixth switch disposed to connect the second leg of the first full bridge circuit and the second leg of the second full bridge circuit;

a seventh switch disposed to connect an end of the link capacitor to a positive electrode of a battery; and an eighth switch disposed to connect an upper end of the first full bridge circuit and the end of the link capacitor.

17. The charging apparatus according to claim 16, wherein the condition of the at least one AC input power includes a multi-phase condition and a single-phase condition of the at least one AC input power.

18. The charging apparatus according to claim 16, wherein the condition of the at least one AC input power includes a symmetric power condition and an asymmetric power condition of the at least one AC input power.

* * * * *